(12) United States Patent
Mishra et al.

(10) Patent No.: US 11,573,933 B2
(45) Date of Patent: Feb. 7, 2023

(54) METHODS AND SYSTEMS FOR IDENTIFYING AND RETRIEVING HIERARCHICALLY RELATED FILES

(71) Applicant: Box, Inc., Redwood City, CA (US)

(72) Inventors: Advait Kumar Mishra, Sunnyvale, CA (US); Kirill Minkovich, Mountain View, CA (US); Edward Chan, San Ramon, CA (US)

(73) Assignee: Box, Inc., Redwood City, CA (US)

( * ) Notice: Subject to any disclaimer, the term of this patent is extended or adjusted under 35 U.S.C. 154(b) by 256 days.

(21) Appl. No.: 16/684,280

(22) Filed: Nov. 14, 2019

(65) Prior Publication Data

US 2021/0149849 A1    May 20, 2021

(51) Int. Cl.
| | |
|---|---|
| *G06F 16/18* | (2019.01) |
| *G06F 16/16* | (2019.01) |
| *G06F 16/14* | (2019.01) |
| *G06F 16/185* | (2019.01) |

(52) U.S. Cl.
CPC .......... *G06F 16/1873* (2019.01); *G06F 16/14* (2019.01); *G06F 16/162* (2019.01); *G06F 16/185* (2019.01)

(58) Field of Classification Search
CPC .... G06F 16/1873; G06F 16/14; G06F 16/162; G06F 16/185
See application file for complete search history.

(56) References Cited

U.S. PATENT DOCUMENTS

| | | | |
|---|---|---|---|
| 2018/0260399 A1* | 9/2018 | Diederich | G06F 16/164 |
| 2019/0147092 A1* | 5/2019 | Pal | G06F 16/90335 |
| | | | 707/713 |

* cited by examiner

*Primary Examiner* — Mark D Featherstone
*Assistant Examiner* — Samuel C Sharpless, III
(74) *Attorney, Agent, or Firm* — Sheridan Ross P.C.

(57) ABSTRACT

Embodiments of the disclosure provide systems and methods for identifying hierarchically related files stored in a database. According to one embodiment, this can be accomplished using a pipeline of worker applications which each use a specific table stored in the database 35 and a sequence or series of queues. Generally speaking, each worker application can read a message identifying tasks to be performed from one queue in the sequence of queues, perform those tasks using the appropriate table from the database to identify a set of files, and write one or more messages to a subsequent queue in the sequence or series of queues to pass results and/or further tasks to be performed to a subsequent worker application in the pipeline of worker applications.

20 Claims, 7 Drawing Sheets

METHODS AND SYSTEMS FOR IDENTIFYING AND RETRIEVING HIERARCHICALLY RELATED FILES

FIELD OF THE DISCLOSURE

Embodiments of the present disclosure relate generally to methods and systems for retrieving information from a database and more particularly to identifying and retrieving hierarchically related files stored in a database.

BACKGROUND

A database such as used by a cloud-based storage system or online collaboration environment can store a large number of files for any number of different enterprises or other entities. These files can be arranged hierarchically. For example, the files belonging to and/or associated with each enterprise or other entity can be further owned by and/or associated with any number of different users. These user files can further be organized hierarchically by file and version. In some cases, such as when performing a data migration or other maintenance functions, all files owned by and/or associated with a specific enterprise or other entity need to be identified and retrieved. However, doing so is burdensome and time consuming and typically requires manual execution of a series of queries at various levels of the hierarchy. Hence, there is a need for improved methods and systems for identifying and retrieving hierarchically related files stored in a database.

BRIEF SUMMARY

Embodiments of the disclosure provide systems and methods for identifying hierarchically related files stored in a database. According to one embodiment, this can be accomplished using a pipeline of worker applications which each use a specific table stored in the database 35 and a sequence or series of queues. Generally speaking, each worker application can read a message identifying tasks to be performed from one queue in the sequence of queues, perform those tasks using the appropriate table from the database to identify a set of files, and write one or more messages to a subsequent queue in the sequence or series of queues to pass results and/or further tasks to be performed to a subsequent worker application in the pipeline of worker applications. In this way, the pipeline of worker applications can begin at a top of the hierarchy and traverse down the hierarchy to find all relevant files, for example, all files associated with or owned by a particular enterprise or other entity.

According to one embodiment, a method for identifying hierarchically related files stored in a database can comprise reading, by a first worker application of a plurality of worker applications executing on a server, from an input queue, an input message identifying one or more tasks to be performed by the first worker application to identify files at a first, top level of a plurality of levels of a hierarchy. The one or more tasks identified in the input message can be executed by the first worker application. The one or more tasks can comprise one or more queries to a table associated with the first level of the hierarchy. The table associated with the first level of the hierarchy can identify files at the first level of the hierarchy based on metadata for the files. The metadata can further indicate a hierarchical relationship between the files stored in the database. Executing the one or more tasks identified in the input message read from the input queue can further comprise obtaining a batch of rows from the table associated with the first level of the hierarchy, each row of the obtained batch of rows related to a file having an identifier of the first level of the hierarchy matching an identifier indicated in the input message read from the input file. For example, the first level of the hierarchy can be associated with an enterprise and the identifier of the first level of the hierarchy can comprise an enterprise identifier.

One or more messages can be generated by the first worker application based on results of executing the one or more tasks identified in the input message and the generated one or more messages can be stored by the first worker application in a first intermediate queue. The first intermediate queue can comprise an input queue for a second worker application of the plurality of worker applications and the one or more messages stored in the first intermediate queue can identify one or more tasks to be performed by the second worker application to identify files at a second level of the plurality of levels of the hierarchy. Generating the one or more messages based on results of executing the one or more tasks identified in the input message read from the input file can comprise generating one message per row of the obtained batch of rows.

Executing the one or more tasks identified in the input message read from the input queue and generating the one or more messages based on results of executing the one or more tasks identified in the input message read from the input file can be repeated for up to a predetermined number of iterations. In response to identifying all files having an identifier of the first level of the hierarchy matching the identifier indicated in the input message read from the input queue before performing the predetermined number of iterations, the input message can be deleted from the input queue. In response to performing the predetermined number of iterations, the input message can be from the input queue and a new message can be written to the input queue. The new message can indicate a progress of the predetermined number of iterations.

The second worker application can read one of the one or more messages stored in the first intermediate queue and executing the one or more tasks identified in the message read from the first intermediate queue. The one or more tasks can comprise one or more queries to a table associated with the second level of the hierarchy. The table associated with the second level of the hierarchy can identify files at the second level of the hierarchy based on the metadata for the files at the second level of the hierarchy. Executing the one or more tasks identified in the message read from the first intermediate queue can further comprise obtaining a batch of rows from the table associated with the second level of the hierarchy, each row of the obtained batch of rows related to a file having an identifier of the second level of the hierarchy matching an identifier indicated in the message read from the first intermediate queue. For example, the second level of the hierarchy can be associated with a user associated with the enterprise and the identifier of the second level of the hierarchy can comprise a user identifier.

One or more messages can be generated by the second worker application based on results of executing the one or more tasks identified in the message read from the first intermediate queue. Generating the one or more messages based on results of executing the one or more tasks identified in the message read from the first intermediate queue can comprise generating one message per row of the obtained batch of rows. The generated one or more messages can be stored by the second worker application in a second intermediate queue. The second intermediate queue can comprise an input queue for a third worker application of the plurality of worker applications and the one or more messages stored in the second intermediate queue can identify one or more tasks to be performed by the third worker application to identify files at a third level of the plurality of levels of the hierarchy.

Executing the one or more tasks identified in the message read from the first intermediate queue and generating the one or more messages based on results of executing the one or more tasks identified in the message read from the first intermediate queue can be repeated for up to the predetermined number of iterations. In response to identifying all files having an identifier of the second level of the hierarchy matching the identifier indicated in the message read from the first intermediate queue before performing the predetermined number of iterations, the message can be deleted from the first intermediate queue. In response to performing the predetermined number of iterations, the message can be deleted from the first intermediate queue and a new message can be written to the first intermediate queue. The new message can indicate a progress of the predetermined number of iterations.

One of the one or more messages stored in the second intermediate queue can be read by the third worker application and the one or more tasks identified in the message read from the second intermediate queue can be executed by the third worker application. The one or more tasks can comprise one or more queries to a table associated with the third level of the hierarchy. The table associated with the third level of the hierarchy can identify files at the third level of the hierarchy based on the metadata for the files. Executing the one or more tasks identified in the message read from the second intermediate queue can further comprise obtaining a batch of rows from the table associated with the third level of the hierarchy. Each row of the obtained batch of rows related to a file can have an identifier of the third level of the hierarchy matching an identifier indicated in the message read from the second intermediate queue. For example, the third level of the hierarchy can be associated with a file associated with the user and the identifier of the third level of the hierarchy can comprise a file identifier.

One or more messages can be generated by the third worker application based on results of executing the one or more tasks identified in the message read from the second intermediate queue. Generating the one or more messages based on results of executing the one or more tasks identified in the message read from the second intermediate queue can comprise generating one message per row of the obtained batch of rows. The generated one or more messages can be stored by the third worker application in a third intermediate queue and an output queue. The third intermediate queue can comprise an input queue for a fourth worker application of the plurality of worker applications and the one or more messages stored in the third intermediate queue can identify one or more tasks to be performed by the fourth worker application to identify files at a fourth level of the plurality of levels of the hierarchy.

Executing the one or more tasks identified in the message read from the second intermediate queue and generating the one or more messages based on results of executing the one or more tasks identified in the message read from the second intermediate queue can be repeated for up to the predetermined number of iterations. In response to identifying all files having an identifier of the third level of the hierarchy matching the identifier indicated in the message read from the second intermediate queue before performing the predetermined number of iterations, the message can be deleted from the second intermediate queue. In response to performing the predetermined number of iterations, the message can be deleted from the second intermediate queue and a new message can be written to the second intermediate queue. The new message can indicate a progress of the predetermined number of iterations.

One of the one or more messages stored in the third intermediate queue can be read by the fourth worker application and the one or more tasks identified in the message read from the third intermediate queue can be executed by the fourth worker application. The one or more tasks can comprise one or more queries to a table associated with the fourth level of the hierarchy. The table associated with the fourth level of the hierarchy can identify files at the fourth level of the hierarchy based on the metadata for the files. Executing the one or more tasks identified in the message read from the third intermediate queue can further comprise obtaining a batch of rows from the table associated with the fourth level of the hierarchy. Each row of the obtained batch of rows related to a file can have an identifier of the fourth level of the hierarchy matching an identifier indicated in the message read from the third intermediate queue. For example, the fourth level of the hierarchy can be associated with a version associated with the file and the identifier of the fourth level of the hierarchy can comprise a version identifier.

One or more messages can be generated by the fourth worker application based on results of executing the one or more tasks identified in the message read from the third intermediate queue. Generating the one or more messages based on results of executing the one or more tasks identified in the message read from the third intermediate queue can comprise generating one message per row of the obtained batch of rows. The generated one or more messages can be stored in the output queue by the fourth worker application.

Executing the one or more tasks identified in the message read from the third intermediate queue and generating the one or more messages based on results of executing the one or more tasks identified in the message read from the third intermediate queue can be repeated for up to the predetermined number of iterations. In response to identifying all files having an identifier of the fourth level of the hierarchy matching the identifier indicated in the message read from the third intermediate queue before performing the predetermined number of iterations, the message can be deleted from the third intermediate queue. In response to performing the predetermined number of iterations, the message can be deleted from the third intermediate queue and a new message can be written to the third intermediate queue. The new message can indicate a progress of the predetermined number of iterations. All versions of all files indicated by the messages stored in the output queue by the third worker application and the fourth worker application can be retrieved by the fourth worker application.

According to another embodiment, a system can comprise a processor and a memory coupled with and readable by the processor. The memory can store therein a set of instructions which, when executed by the processor, causes the processor to identify hierarchically related files stored in a database by reading, by an enterprise worker application of a plurality of worker applications executing by the processor, from an input queue, an input message identifying one or more tasks to be performed by the enterprise worker application to identify files at a top, enterprise level of a plurality of levels of a hierarchy. The one or more tasks identified in the input message can be executed by the enterprise worker application. The one or more tasks can comprise one or more queries to a table associated with the enterprise level of the hierarchy. The table associated with the enterprise level of the hierarchy can identify files at the enterprise level of the hierarchy based on metadata for the files. The metadata can further indicate a hierarchical relationship between the files stored in the database. Executing the one or more tasks identified in the input message read from the input queue can further comprise obtaining a batch of rows from the table associated with the enterprise level of the hierarchy. Each row of the obtained batch of rows related to a file can have an enterprise identifier matching an enterprise identifier indicated in the input message read from the input file.

One or more messages can be generated by the enterprise worker application based on results of executing the one or more tasks identified in the input message. Generating the one or more messages based on results of executing the one or more tasks identified in the input message read from the input file can comprise generating one message per row of the obtained batch of rows. The generated one or more messages can be stored by the enterprise worker application in a first intermediate queue. The first intermediate queue can comprise an input queue for a user worker application of the plurality of worker applications. The one or more messages stored in the first intermediate queue can identify one or more tasks to be performed by the user worker application to identify files at a user level of the plurality of levels of the hierarchy.

Executing the one or more tasks identified in the input message read from the input queue and generating the one or more messages based on results of executing the one or more tasks identified in the input message read from the input file can be repeated for up to a predetermined number of iterations. In response to identifying all files having an enterprise identifier matching the enterprise identifier indicated in the input message read from the input queue before performing the predetermined number of iterations, the input message can be deleted from the input queue. In response to performing the predetermined number of iterations, the input message can be deleted from the input queue and a new message can be written to the input queue. The new message can indicate a progress of the predetermined number of iterations.

One of the one or more messages stored in the first intermediate queue can be read by the user worker application and the one or more tasks identified in the message read from the first intermediate queue can be executed by the user worker application. The one or more tasks can comprise one or more queries to a table associated with the user level of the hierarchy. The table associated with the user level of the hierarchy can identify files at the user level of the hierarchy based on the metadata for the files at the user level of the hierarchy. Executing the one or more tasks identified in the message read from the first intermediate queue can further comprise obtaining a batch of rows from the table associated with the user level of the hierarchy. Each row of the obtained batch of rows related to a file can have a user identifier matching a user identifier indicated in the message read from the first intermediate queue.

One or more messages can be generated by the user worker application based on results of executing the one or more tasks identified in the message read from the first intermediate queue. Generating the one or more messages based on results of executing the one or more tasks identified in the message read from the first intermediate queue can comprise generating one message per row of the obtained batch of rows. The generated one or more messages can be stored by the user worker application in a second intermediate queue. The second intermediate queue can comprise an input queue for a file worker application of the plurality of worker applications. The one or more messages stored in the second intermediate queue can identify one or more tasks to be performed by the file worker application to identify files at a file level of the plurality of levels of the hierarchy.

Executing the one or more tasks identified in the message read from the first intermediate queue and generating the one or more messages based on results of executing the one or more tasks identified in the message read from the first intermediate queue can be repeated for up to the predetermined number of iterations. In response to identifying all files having a user identifier matching the user identifier indicated in the message read from the first intermediate queue before performing the predetermined number of iterations, the message can be deleted from the first intermediate queue. In response to performing the predetermined number of iterations, the message can be deleted from the first intermediate queue and a new message can be written to the first intermediate queue. The new message can indicate a progress of the predetermined number of iterations.

One of the one or more messages stored in the second intermediate queue can be read by the file worker application and the one or more tasks identified in the message read from the second intermediate queue can be executed by the file worker application. The one or more tasks can comprise one or more queries to a table associated with the file level of the hierarchy. The table associated with the file level of the hierarchy can identify files at the file level of the hierarchy based on the metadata for the files at the file level of the hierarchy. Executing the one or more tasks identified in the message read from the second intermediate queue can further comprise obtaining a batch of rows from the table associated with the file level of the hierarchy. Each row of the obtained batch of rows can be related to a file having a file identifier matching a file identifier indicated in the message read from the second intermediate queue.

One or more messages can be generated by the file worker application based on results of executing the one or more tasks identified in the message read from the second intermediate queue. Generating the one or more messages based on results of executing the one or more tasks identified in the message read from the second intermediate queue can comprise generating one message per row of the obtained batch of rows. The generated one or more messages can be stored by the file worker application in a third intermediate queue and an output queue. The third intermediate queue can comprise an input queue for a file version worker application of the plurality of worker applications. The one or more messages stored in the third intermediate queue can identify one or more tasks to be performed by the file version worker application to identify files at a version level of the plurality of levels of the hierarchy.

Executing the one or more tasks identified in the message read from the second intermediate queue and generating the one or more messages based on results of executing the one or more tasks identified in the message read from the second intermediate queue can be repeated for up to the predetermined number of iterations. In response to identifying all files having a file identifier matching the file identifier indicated in the message read from the second intermediate queue before performing the predetermined number of iterations, the message can be deleted from the second intermediate queue. In response to performing the predetermined number of iterations, the message can be deleted from the second intermediate queue and a new message can be written to the second intermediate queue. The new message can indicate a progress of the predetermined number of iterations.

One of the one or more messages stored in the third intermediate queue can be read by the file version worker application and the one or more tasks identified in the message read from the third intermediate queue can be executed by the file version worker application. The one or more tasks can comprise one or more queries to a table associated with the version level of the hierarchy. The table associated with the version level of the hierarchy can identify files at the version level of the hierarchy based on the metadata for the files. Executing the one or more tasks identified in the message read from the third intermediate queue can further comprise obtaining a batch of rows from the table associated with the version level of the hierarchy. Each row of the obtained batch of rows related to a file can have a file version identifier matching a file version identifier indicated in the message read from the third intermediate queue.

One or more messages can be generated by the file version worker application based on results of executing the one or more tasks identified in the message read from the third intermediate queue. The generated one or more messages can be stored by the file version worker application in the output queue. Generating the one or more messages based on results of executing the one or more tasks identified in the message read from the third intermediate queue can comprise generating one message per row of the obtained batch of rows.

Executing the one or more tasks identified in the message read from the third intermediate queue and generating the one or more messages based on results of executing the one or more tasks identified in the message read from the third intermediate queue can be repeated for up to the predetermined number of iterations. In response to identifying all files having a file version identifier matching the file version identifier indicated in the message read from the third intermediate queue before performing the predetermined number of iterations, the message can be deleted from the third intermediate queue. In response to performing the predetermined number of iterations, the message can be deleted from the third intermediate queue and a new message can be written to the third intermediate queue. The new message can indicate a progress of the predetermined number of iterations. All versions of all files indicated by the messages stored in the output queue by the file worker application and the file version worker application can then be retrieved by the file version worker application.

According to yet another embodiment, a non-transitory, computer-readable medium can comprise a set of instructions stored therein which, when executed by a processor, causes the processor to identify hierarchically related files stored in a database by reading, by an enterprise worker application of a plurality of worker applications executing by the processor, from an input queue, an input message identifying one or more tasks to be performed by the enterprise worker application to identify files at a top, enterprise level of a plurality of levels of a hierarchy. The one or more tasks identified in the input message can be executed by the enterprise worker application. The one or more tasks can comprise one or more queries to a table associated with the enterprise level of the hierarchy. The table associated with the enterprise level of the hierarchy can identify files at the enterprise level of the hierarchy based on metadata for the files. The metadata can further indicate a hierarchical relationship between the files stored in the database. Executing the one or more tasks identified in the input message read from the input queue can further comprise obtaining a batch of rows from the table associated with the enterprise level of the hierarchy. Each row of the obtained batch of rows related to a file can have an enterprise identifier matching an enterprise identifier indicated in the input message read from the input file.

One or more messages can be generated by the enterprise worker application based on results of executing the one or more tasks identified in the input message. Generating the one or more messages based on results of executing the one or more tasks identified in the input message read from the input file can comprise generating one message per row of the obtained batch of rows. The generated one or more messages can be stored by the enterprise worker application in a first intermediate queue. The first intermediate queue can comprise an input queue for a user worker application of the plurality of worker applications. The one or more messages stored in the first intermediate queue can identify one or more tasks to be performed by the user worker application to identify files at a user level of the plurality of levels of the hierarchy.

Executing the one or more tasks identified in the input message read from the input queue and generating the one or more messages based on results of executing the one or more tasks identified in the input message read from the input file can be repeated for up to a predetermined number of iterations. In response to identifying all files having an enterprise identifier matching the enterprise identifier indicated in the input message read from the input queue before performing the predetermined number of iterations, the input message can be deleted from the input queue. In response to performing the predetermined number of iterations, the input message can be deleted from the input queue and a new message can be written to the input queue. The new message can indicate a progress of the predetermined number of iterations.

One of the one or more messages stored in the first intermediate queue can be read by the user worker application and the one or more tasks identified in the message read from the first intermediate queue can be executed by the user worker application. The one or more tasks can comprise one or more queries to a table associated with the user level of the hierarchy. The table associated with the user level of the hierarchy can identify files at the user level of the hierarchy based on the metadata for the files at the user level of the hierarchy. Executing the one or more tasks identified in the message read from the first intermediate queue can further comprise obtaining a batch of rows from the table associated with the user level of the hierarchy. Each row of the obtained batch of rows related to a file can have a user identifier matching a user identifier indicated in the message read from the first intermediate queue.

One or more messages can be generated by the user worker application based on results of executing the one or more tasks identified in the message read from the first intermediate queue. Generating the one or more messages based on results of executing the one or more tasks identified in the message read from the first intermediate queue can comprise generating one message per row of the obtained batch of rows. The generated one or more messages can be stored by the user worker application in a second intermediate queue. The second intermediate queue can comprise an input queue for a file worker application of the plurality of worker applications. The one or more messages stored in the second intermediate queue can identify one or more tasks to be performed by the file worker application to identify files at a file level of the plurality of levels of the hierarchy.

Executing the one or more tasks identified in the message read from the first intermediate queue and generating the one or more messages based on results of executing the one or more tasks identified in the message read from the first intermediate queue can be repeated for up to the predetermined number of iterations. In response to identifying all files having a user identifier matching the user identifier indicated in the message read from the first intermediate queue before performing the predetermined number of iterations, the message can be deleted from the first intermediate queue. In response to performing the predetermined number of iterations, the message can be deleted from the first intermediate queue and a new message can be written to the first intermediate queue. The new message can indicate a progress of the predetermined number of iterations.

One of the one or more messages stored in the second intermediate queue can be read by the file worker application and the one or more tasks identified in the message read from the second intermediate queue can be executed by the file worker application. The one or more tasks can comprise one or more queries to a table associated with the file level of the hierarchy. The table associated with the file level of the hierarchy can identify files at the file level of the hierarchy based on the metadata for the files at the file level of the hierarchy. Executing the one or more tasks identified in the message read from the second intermediate queue can further comprise obtaining a batch of rows from the table associated with the file level of the hierarchy. Each row of the obtained batch of rows can be related to a file having a file identifier matching a file identifier indicated in the message read from the second intermediate queue.

One or more messages can be generated by the file worker application based on results of executing the one or more tasks identified in the message read from the second intermediate queue. Generating the one or more messages based on results of executing the one or more tasks identified in the message read from the second intermediate queue can comprise generating one message per row of the obtained batch of rows. The generated one or more messages can be stored by the file worker application in a third intermediate queue and an output queue. The third intermediate queue can comprise an input queue for a file version worker application of the plurality of worker applications. The one or more messages stored in the third intermediate queue can identify one or more tasks to be performed by the file version worker application to identify files at a version level of the plurality of levels of the hierarchy.

Executing the one or more tasks identified in the message read from the second intermediate queue and generating the one or more messages based on results of executing the one or more tasks identified in the message read from the second intermediate queue can be repeated for up to the predetermined number of iterations. In response to identifying all files having a file identifier matching the file identifier indicated in the message read from the second intermediate queue before performing the predetermined number of iterations, the message can be deleted from the second intermediate queue. In response to performing the predetermined number of iterations, the message can be deleted from the second intermediate queue and a new message can be written to the second intermediate queue. The new message can indicate a progress of the predetermined number of iterations.

One of the one or more messages stored in the third intermediate queue can be read by the file version worker application and the one or more tasks identified in the message read from the third intermediate queue can be executed by the file version worker application. The one or more tasks can comprise one or more queries to a table associated with the version level of the hierarchy. The table associated with the version level of the hierarchy can identify files at the version level of the hierarchy based on the metadata for the files. Executing the one or more tasks identified in the message read from the third intermediate queue can further comprise obtaining a batch of rows from the table associated with the version level of the hierarchy. Each row of the obtained batch of rows related to a file can have a file version identifier matching a file version identifier indicated in the message read from the third intermediate queue.

One or more messages can be generated by the file version worker application based on results of executing the one or more tasks identified in the message read from the third intermediate queue. The generated one or more messages can be stored by the file version worker application in the output queue. Generating the one or more messages based on results of executing the one or more tasks identified in the message read from the third intermediate queue can comprise generating one message per row of the obtained batch of rows.

Executing the one or more tasks identified in the message read from the third intermediate queue and generating the one or more messages based on results of executing the one or more tasks identified in the message read from the third intermediate queue can be repeated for up to the predetermined number of iterations. In response to identifying all files having a file version identifier matching the file version identifier indicated in the message read from the third intermediate queue before performing the predetermined number of iterations, the message can be deleted from the third intermediate queue. In response to performing the predetermined number of iterations, the message can be deleted from the third intermediate queue and a new message can be written to the third intermediate queue. The new message can indicate a progress of the predetermined number of iterations. All versions of all files indicated by the messages stored in the output queue by the file worker application and the file version worker application can then be retrieved by the file version worker application.

Figure 1:
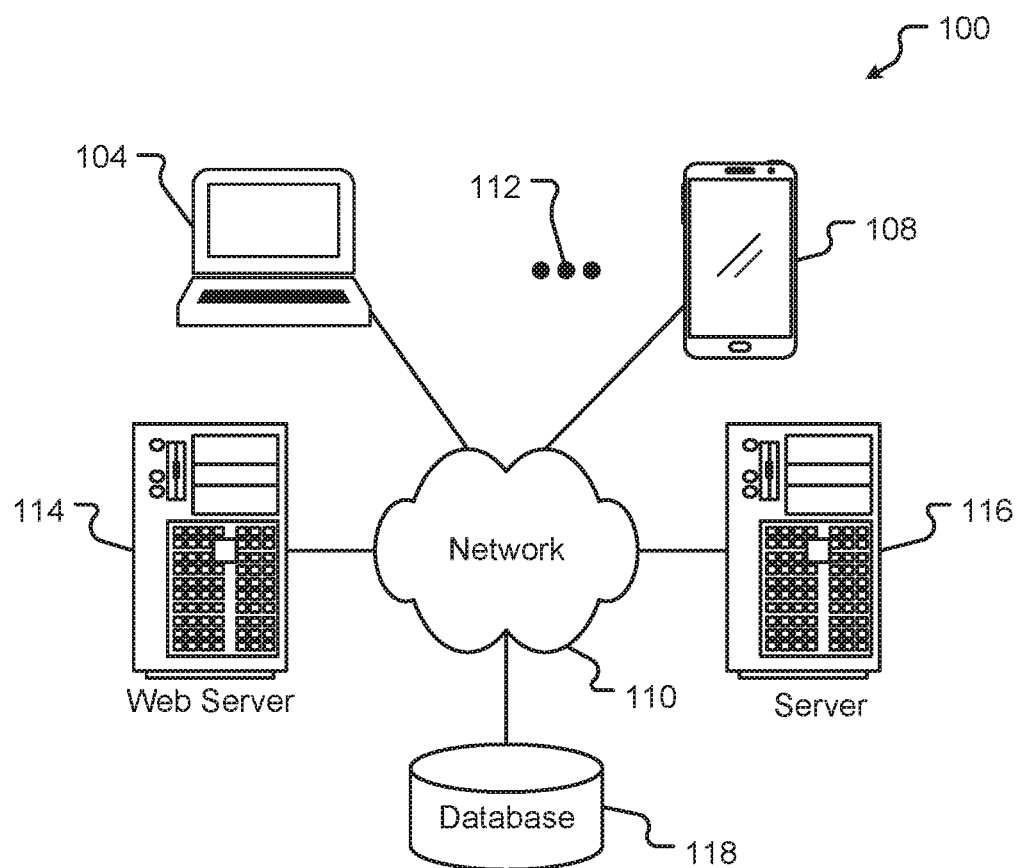
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local-Area Network (LAN) and/or Wide-Area Network (WAN) such as the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, Non-Volatile Random-Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a Compact Disk Read-Only Memory (CD-ROM), any other optical medium, punch cards, paper tape, any other physical medium with patterns of holes, a Random-Access Memory (RAM), a Programmable Read-Only Memory (PROM), and Erasable Programmable Read-Only Memory (EPROM), a Flash-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, Radio Frequency (RF), etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL), special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or Very Large-Scale Integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 maybe a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP servers, HyperText Transfer Protocol (secure) (HTTP(s)) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or Tool Command Language (TCL), as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to Structured Query Language (SQL) formatted commands.

Figure 2:
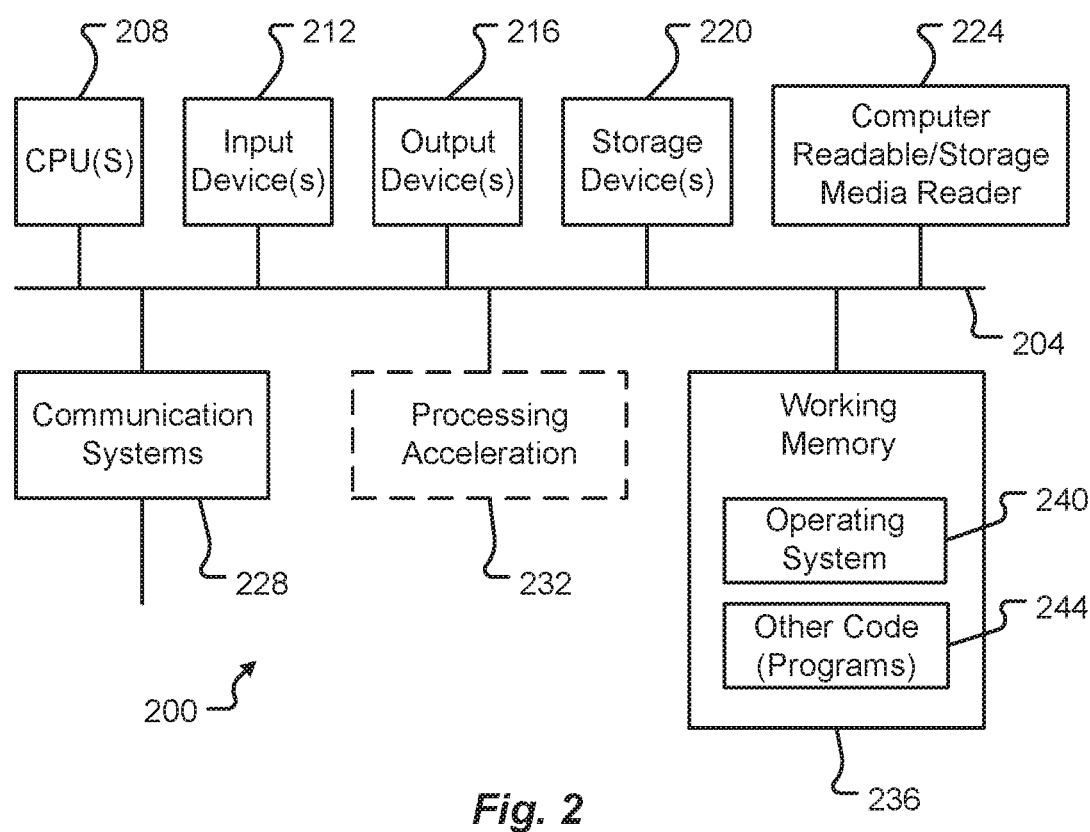
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
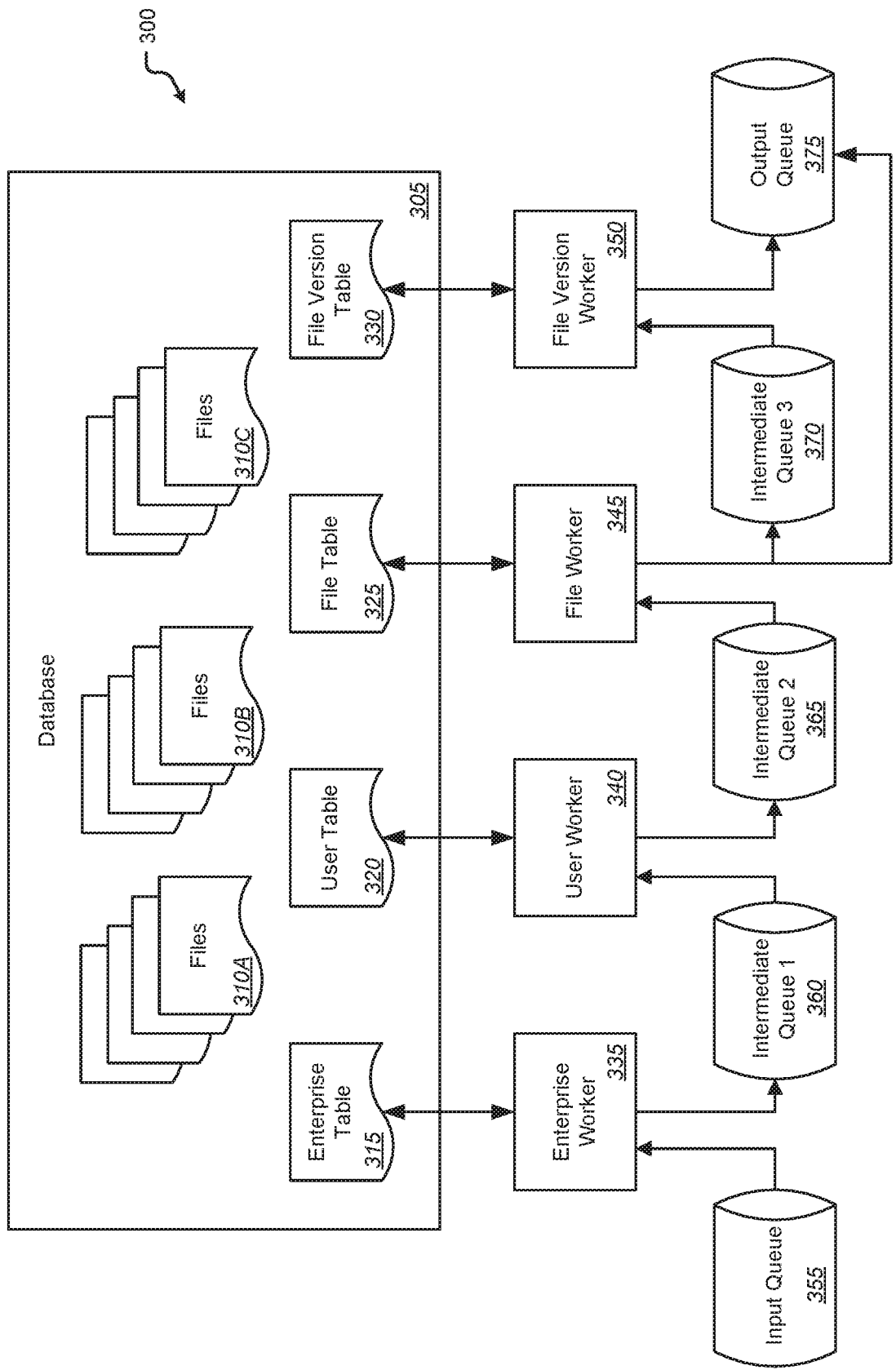
FIG. 3 is a block diagram illustrating elements of an exemplary system for identifying and retrieving hierarchically related files stored in a database according to one embodiment.

FIG. 3 is a block diagram illustrating elements of an exemplary system for identifying and retrieving hierarchically related files 310A-310C stored in a database 305 according to one embodiment. As illustrated in this example, the system 300 can comprise a database 305 or other repository such as those described above. The database 305 can store a set of files 310A-310C and provide, for example, a cloud storage solution, a collaboration environment, etc. as known in the art. In such environment, the files 310A-310C can belong to and/or be associated with a number of different entities. For example, one set of files 310A can belong to and/or be associated with one enterprise or other entity which utilizes the cloud storage and/or collaboration environment provided by the system 300 while other sets of files 310B and 310C belong to and/or are associated with different enterprises or other entities. Additionally, the files 310A-310C can be hierarchically related. For example, the files 310A of a particular entity can be owned by and/or related to any number of different users and can further be related by file and/or folder, version number, etc.

Embodiments described herein are directed to identifying and retrieving hierarchically related files 310A-310C stored in the database 305. According to one embodiment, this can be accomplished using a pipeline of worker applications 335-350 which each use a specific table 315-330 stored in the database 305 and a sequence or series of queues 355-375. Generally speaking, each worker application 335-350 can read a message identifying tasks to be performed from one queue in the sequence of queues 355-375, perform those tasks using the appropriate table 315-330 from the database 305 to identify a set of files 310A-310C, and write one or more messages to a subsequent queue in the sequence or series of queues 355-375 to pass results and/or further tasks to be performed to a subsequent worker application in the pipeline of worker applications 335-350. In this way, the pipeline of worker applications 335-350 can begin at a top of the hierarchy and traverse down the hierarchy to find all relevant files, for example, all files associated with or owned by a particular enterprise or other entity.

More specifically, and according to one embodiment, identifying hierarchically related files 310A-310C stored in a database 305 can comprise reading, by an enterprise worker application 335 of a plurality of worker applications 335-350, from an input queue 355, an input message identifying one or more tasks to be performed by the enterprise worker application 335 to identify files 310A-310C at a top, enterprise level of a plurality of levels of a hierarchy. The one or more tasks identified in the input message can be executed by the enterprise worker application 335. The one or more tasks can comprise one or more queries to a table associated with the enterprise level of the hierarchy. The table associated with the enterprise level of the hierarchy can identify files 310A-310C at the enterprise level of the hierarchy based on metadata for the files 310A-310C. The metadata can further indicate a hierarchical relationship between the files 310A-310C stored in the database 305. Executing the one or more tasks identified in the input message read from the input queue 355 can further comprise obtaining a batch of rows from the table associated with the enterprise level of the hierarchy. Each row of the obtained batch of rows related to a file can have an enterprise identifier matching an enterprise identifier indicated in the input message read from the input file.

One or more messages can be generated by the enterprise worker application 335 based on results of executing the one or more tasks identified in the input message. Generating the one or more messages based on results of executing the one or more tasks identified in the input message read from the input file can comprise generating one message per row of the obtained batch of rows. The generated one or more messages can be stored by the enterprise worker application 335 in a first intermediate queue 360. The first intermediate queue 360 can comprise an input queue 355 for a user worker application 340 of the plurality of worker applications. The one or more messages stored in the first intermediate queue 360 can identify one or more tasks to be performed by the user worker application 340 to identify files 310A-310C at a user level of the plurality of levels of the hierarchy.

Executing the one or more tasks identified in the input message read from the input queue 355 and generating the one or more messages based on results of executing the one or more tasks identified in the input message read from the input file can be repeated for up to a predetermined number of iterations. The number of iterations can be configurable, statically defined value or, in some cases, can be dynamically determined. For example, the number of iterations can be directly proportional to the number of files in the input queue 355, i.e., a greater number of iterations for a larger number of files which can be determined, e.g., based on a preconfigured ration, past results, etc. In response to identifying all files 310A-310C having an enterprise identifier matching the enterprise identifier indicated in the input message read from the input queue 355 before performing the predetermined number of iterations, the input message can be deleted from the input queue 355. In response to performing the predetermined number of iterations, the input message can be deleted from the input queue 355 and a new message can be written to the input queue 355. The new message can indicate a progress of the predetermined number of iterations.

One of the one or more messages stored in the first intermediate queue 360 can be read by the user worker application 340 and the one or more tasks identified in the message read from the first intermediate queue 360 can be executed by the user worker application 340. The one or more tasks can comprise one or more queries to a table associated with the user level of the hierarchy. The table associated with the user level of the hierarchy can identify files 310A-310C at the user level of the hierarchy based on the metadata for the files 310A-310C at the user level of the hierarchy. Executing the one or more tasks identified in the message read from the first intermediate queue 360 can further comprise obtaining a batch of rows from the table associated with the user level of the hierarchy. Each row of the obtained batch of rows related to a file can have a user identifier matching a user identifier indicated in the message read from the first intermediate queue 360.

One or more messages can be generated by the user worker application 340 based on results of executing the one or more tasks identified in the message read from the first intermediate queue 360. Generating the one or more messages based on results of executing the one or more tasks identified in the message read from the first intermediate queue 360 can comprise generating one message per row of the obtained batch of rows. The generated one or more messages can be stored by the user worker application 340 in a second intermediate queue 365. The second intermediate queue 365 can comprise an input queue for a file worker application 345 of the plurality of worker applications. The one or more messages stored in the second intermediate queue 365 can identify one or more tasks to be performed by the file worker application 345 to identify files 310A-310C at a file level of the plurality of levels of the hierarchy.

Executing the one or more tasks identified in the message read from the first intermediate queue 360 and generating the one or more messages based on results of executing the one or more tasks identified in the message read from the first intermediate queue 360 can be repeated for up to the predetermined number of iterations. The number of iterations can be configurable, statically defined value or, in some cases, can be dynamically determined. For example, the number of iterations can be directly proportional to the number of files in the first intermediate queue 360, i.e., a greater number of iterations for a larger number of files which can be determined, e.g., based on a preconfigured ration, past results, etc. In response to identifying all files 310A-310C having a user identifier matching the user identifier indicated in the message read from the first intermediate queue 360 before performing the predetermined number of iterations, the message can be deleted from the first intermediate queue 360. In response to performing the predetermined number of iterations, the message can be deleted from the first intermediate queue 360 and a new message can be written to the first intermediate queue 360. The new message can indicate a progress of the predetermined number of iterations.

One of the one or more messages stored in the second intermediate queue 365 can be read by the file worker application 345 and the one or more tasks identified in the message read from the second intermediate queue 365 can be executed by the file worker application 345. The one or more tasks can comprise one or more queries to a table associated with the file level of the hierarchy. The table associated with the file level of the hierarchy can identify files 310A-310C at the file level of the hierarchy based on the metadata for the files 310A-310C at the file level of the hierarchy. Executing the one or more tasks identified in the message read from the second intermediate queue 365 can further comprise obtaining a batch of rows from the table associated with the file level of the hierarchy. Each row of the obtained batch of rows can be related to a file having a file identifier matching a file identifier indicated in the message read from the second intermediate queue 365.

One or more messages can be generated by the file worker application 345 based on results of executing the one or more tasks identified in the message read from the second intermediate queue 365. Generating the one or more messages based on results of executing the one or more tasks identified in the message read from the second intermediate queue 365 can comprise generating one message per row of the obtained batch of rows. The generated one or more messages can be stored by the file worker application 345 in a third intermediate queue 370 and an output queue 375. The third intermediate queue 370 can comprise an input queue for a file version worker application 350 of the plurality of worker applications. The one or more messages stored in the third intermediate queue 370 can identify one or more tasks to be performed by the file version worker application 350 to identify files 310A-310C at a version level of the plurality of levels of the hierarchy.

Executing the one or more tasks identified in the message read from the second intermediate queue 365 and generating the one or more messages based on results of executing the one or more tasks identified in the message read from the second intermediate queue 365 can be repeated for up to the predetermined number of iterations. The number of iterations can be configurable, statically defined value or, in some cases, can be dynamically determined. For example, the number of iterations can be directly proportional to the number of files in the second intermediate queue 365, i.e., a greater number of iterations for a larger number of files which can be determined, e.g., based on a preconfigured ration, past results, etc. In response to identifying all files 310A-310C having a file identifier matching the file identifier indicated in the message read from the second intermediate queue 365 before performing the predetermined number of iterations, the message can be deleted from the second intermediate queue 365. In response to performing the predetermined number of iterations, the message can be deleted from the second intermediate queue 365 and a new message can be written to the second intermediate queue 365. The new message can indicate a progress of the predetermined number of iterations.

One of the one or more messages stored in the third intermediate queue 370 can be read by the file version worker application 350 and the one or more tasks identified in the message read from the third intermediate queue 370 can be executed by the file version worker application 350. The one or more tasks can comprise one or more queries to a table associated with the version level of the hierarchy. The table associated with the version level of the hierarchy can identify files 310A-310C at the version level of the hierarchy based on the metadata for the files 310A-310C. Executing the one or more tasks identified in the message read from the third intermediate queue 370 can further comprise obtaining a batch of rows from the table associated with the version level of the hierarchy. Each row of the obtained batch of rows related to a file can have a file version identifier matching a file version identifier indicated in the message read from the third intermediate queue 370.

One or more messages can be generated by the file version worker application 350 based on results of executing the one or more tasks identified in the message read from the third intermediate queue 370. The generated one or more messages can be stored by the file version worker application 350 in the output queue 375. Generating the one or more messages based on results of executing the one or more tasks identified in the message read from the third intermediate queue 370 can comprise generating one message per row of the obtained batch of rows.

Executing the one or more tasks identified in the message read from the third intermediate queue 370 and generating the one or more messages based on results of executing the one or more tasks identified in the message read from the third intermediate queue 370 can be repeated for up to the predetermined number of iterations. The number of iterations can be configurable, statically defined value or, in some cases, can be dynamically determined. For example, the number of iterations can be directly proportional to the number of files in the third intermediate queue 370, i.e., a greater number of iterations for a larger number of files which can be determined, e.g., based on a preconfigured ration, past results, etc. In response to identifying all files 310A-310C having a file version identifier matching the file version identifier indicated in the message read from the third intermediate queue 370 before performing the predetermined number of iterations, the message can be deleted from the third intermediate queue 370. In response to performing the predetermined number of iterations, the message can be deleted from the third intermediate queue 370 and a new message can be written to the third intermediate queue 370. The new message can indicate a progress of the predetermined number of iterations. All versions of all files 310A-310C indicated by the messages stored in the output queue 375 by the file worker application 345 and the file version worker application 350 can then be retrieved by the file version worker application 350 or another application based on the messages written to the output queue 375.

Figure 4:
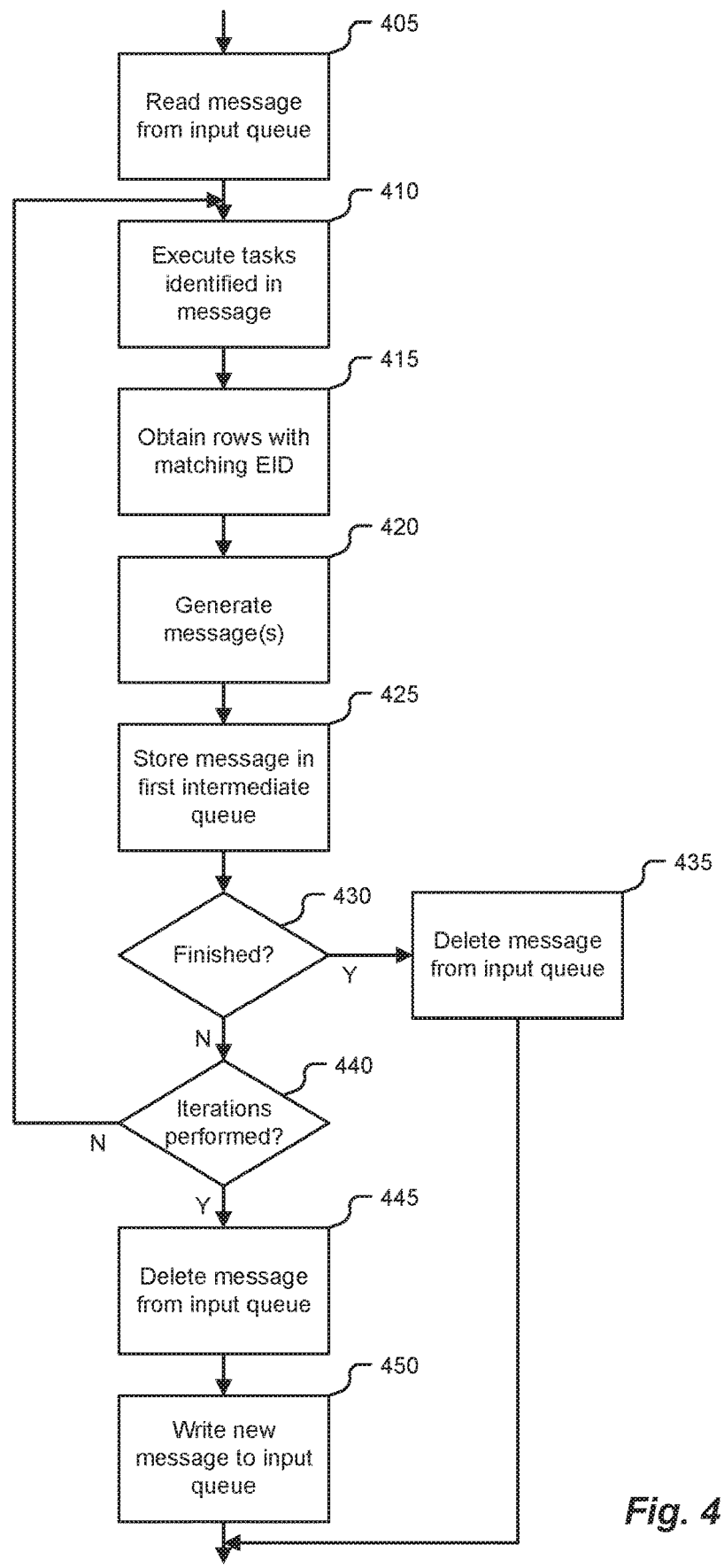
FIG. 4 is a flowchart illustrating an exemplary process for identifying files of a set of hierarchically related files at a first level of the hierarchy according to one embodiment.

FIG. 4 is a flowchart illustrating an exemplary process for identifying files of a set of hierarchically related files at a first level of the hierarchy according to one embodiment. As illustrated in this example, identifying hierarchically related files 310A-310C stored in a database 305 can comprise reading 405, by a first worker application, such as enterprise worker application 335, of a plurality of worker applications executing on a server, from an input queue 355, an input message identifying one or more tasks to be performed by the first worker application to identify files at a first, top level of a plurality of levels of a hierarchy. The one or more tasks identified in the input message can be executed 410 by the first worker application. The one or more tasks can comprise one or more queries to a table associated with the first level of the hierarchy, such as enterprise table 315. The table associated with the first level of the hierarchy can identify files at the first level of the hierarchy based on metadata for the files. The metadata can further indicate a hierarchical relationship between the files stored in the database 305. Executing 410 the one or more tasks identified in the input message read from the input queue 355 can further comprise obtaining 415 a batch of rows from the table associated with the first level of the hierarchy, each row of the obtained batch of rows can be related to a file having an identifier of the first level of the hierarchy matching an identifier indicated in the input message read from the input file. For example, the first level of the hierarchy can be associated with an enterprise and the identifier of the first level of the hierarchy can comprise an enterprise identifier.

One or more messages can be generated 420 by the first worker application based on results of executing 410 the one or more tasks identified in the input message and the generated 420 one or more messages can be stored 425 by the first worker application in a first intermediate queue 360. The first intermediate queue 360 can comprise an input queue for a second worker application of the plurality of worker applications and the one or more messages stored 425 in the first intermediate queue 360 can identify one or more tasks to be performed by the second worker application to identify files at a second level of the plurality of levels of the hierarchy. Generating 420 the one or more messages based on results of executing the one or more tasks identified in the input message read from the input file can comprise generating one message per row of the obtained batch of rows.

Executing 410 the one or more tasks identified in the input message read from the input queue and generating 420 and saving 425 the one or more messages based on results of executing the one or more tasks identified in the input message read from the input file can be repeated for up to a predetermined number of iterations. Accordingly, a determination 430 can be made as to whether all files have been identified and a determination 440 can be made as to whether the number of iterations have been completed, i.e., before all files have been identified. In response to identifying all files having an identifier of the first level of the hierarchy matching the identifier indicated in the input message read from the input queue before performing the predetermined number of iterations, the input message can be deleted 435 from the input queue. In response to performing the predetermined number of iterations, the input message can be deleted 445 from the input queue and a new message can be written 450 to the input queue. The new message can indicate a progress of the predetermined number of iterations.

Figure 5:
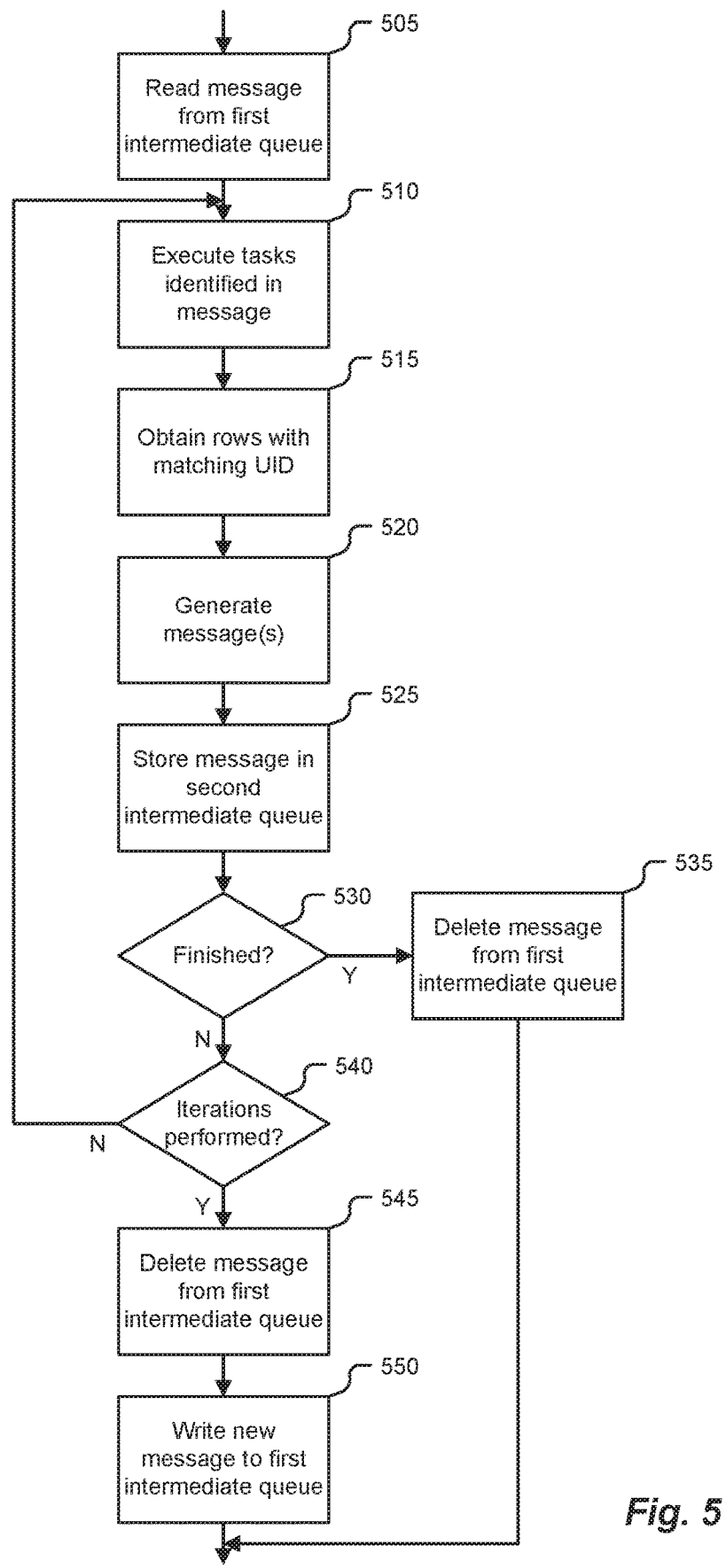
FIG. 5 is a flowchart illustrating an exemplary process for identifying files of a set of hierarchically related files at a second level of the hierarchy according to one embodiment.

FIG. 5 is a flowchart illustrating an exemplary process for identifying files of a set of hierarchically related files at a second level of the hierarchy according to one embodiment. As illustrated in this example, the second worker application, such as user worker 340 can read 505 one of the one or more messages stored in the first intermediate queue 360 and execute 510 the one or more tasks identified in the message read 505 from the first intermediate queue 360. The one or more tasks can comprise one or more queries to a table associated with the second level of the hierarchy, such as user table 320. The table associated with the second level of the hierarchy can identify files at the second level of the hierarchy based on the metadata for the files at the second level of the hierarchy. Executing 510 the one or more tasks identified in the message read from the first intermediate queue 360 can further comprise obtaining 515 a batch of rows from the table associated with the second level of the hierarchy, each row of the obtained batch of rows related to a file having an identifier of the second level of the hierarchy matching an identifier indicated in the message read from the first intermediate queue 360. For example, the second level of the hierarchy can be associated with a user associated with the enterprise and the identifier of the second level of the hierarchy can comprise a user identifier.

One or more messages can be generated 520 by the second worker application based on results of executing the one or more tasks identified in the message read from the first intermediate queue 360. Generating 520 the one or more messages based on results of executing the one or more tasks identified in the message read from the first intermediate queue 360 can comprise generating one message per row of the obtained batch of rows. The generated 520 one or more messages can be stored 525 by the second worker application in a second intermediate queue 365. The second intermediate queue 365 can comprise an input queue for a third worker application of the plurality of worker applications and the one or more messages stored 525 in the second intermediate queue 365 can identify one or more tasks to be performed by the third worker application to identify files at a third level of the plurality of levels of the hierarchy.

Executing 510 the one or more tasks identified in the message read from the first intermediate queue 360 and generating 520 and storing 525 the one or more messages based on results of executing the one or more tasks identified in the message read from the first intermediate queue 360 can be repeated for up to the predetermined number of iterations. Accordingly, a determination 530 can be made as to whether all files have been identified and a determination 540 can be made as to whether the number of iterations have been completed, i.e., before all files have been identified. In response to identifying all files having an identifier of the second level of the hierarchy matching the identifier indicated in the message read from the first intermediate queue 360 before performing the predetermined number of iterations, the message can be deleted 535 from the first intermediate queue 360. In response to performing the predetermined number of iterations, the message can be deleted 545 from the first intermediate queue 360 and a new message can be written 550 to the first intermediate queue 360. The new message can indicate a progress of the predetermined number of iterations.

Figure 6:
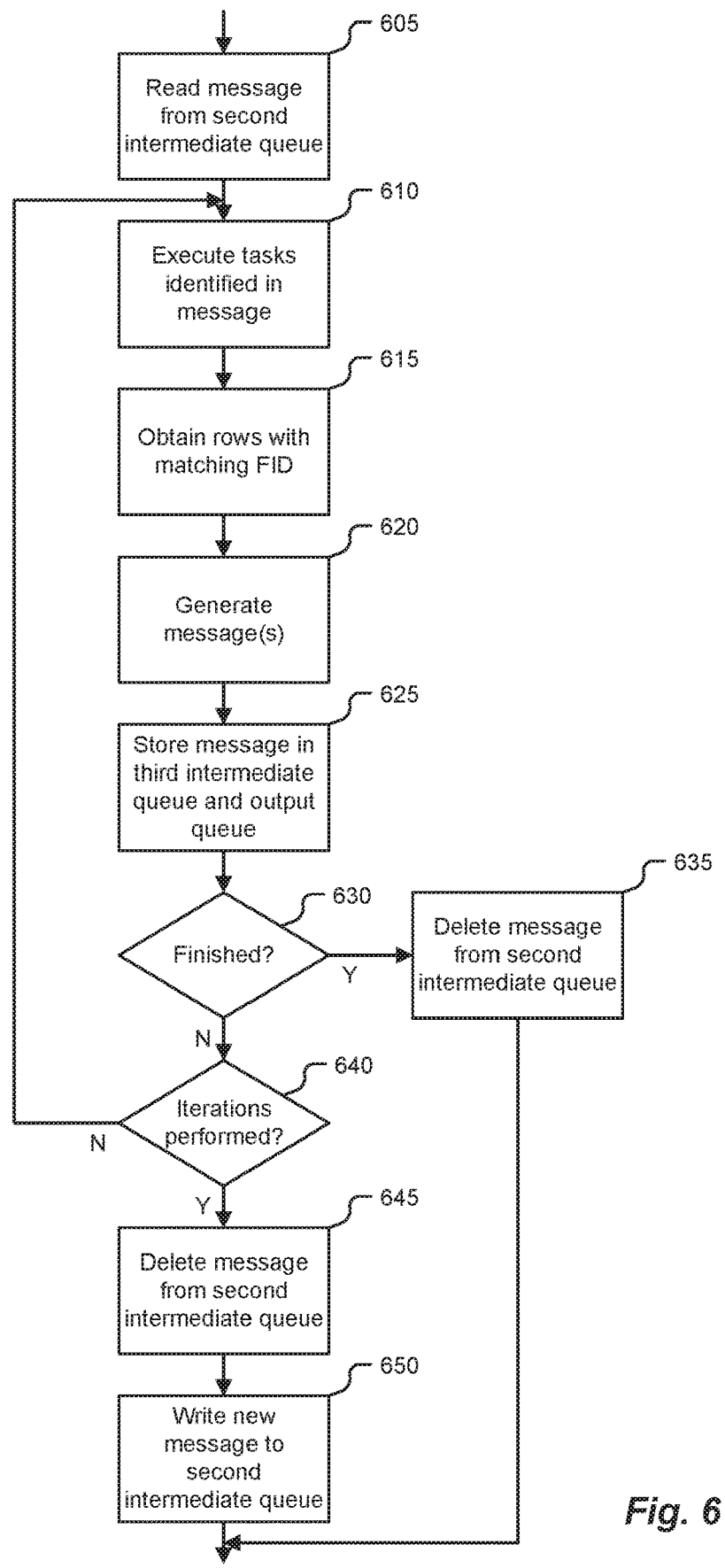
FIG. 6 is a flowchart illustrating an exemplary process for identifying files of a set of hierarchically related files at a third level of the hierarchy according to one embodiment.

FIG. 6 is a flowchart illustrating an exemplary process for identifying files of a set of hierarchically related files at a third level of the hierarchy according to one embodiment. As illustrated in this example, one of the one or more messages stored in the second intermediate queue 365 can be read 605 by the third worker application, such as file worker application 345 and the one or more tasks identified in the message read from the second intermediate queue 365 can be executed 610 by the third worker application. The one or more tasks can comprise one or more queries to a table associated with the third level of the hierarchy, such as file table 325. The table associated with the third level of the hierarchy can identify files at the third level of the hierarchy based on the metadata for the files. Executing 610 the one or more tasks identified in the message read from the second intermediate queue 365 can further comprise obtaining 615 a batch of rows from the table associated with the third level of the hierarchy. Each row of the obtained batch of rows related to a file can have an identifier of the third level of the hierarchy matching an identifier indicated in the message read from the second intermediate queue 365. For example, the third level of the hierarchy can be associated with a file associated with the user and the identifier of the third level of the hierarchy can comprise a file identifier.

One or more messages can be generated 620 by the third worker application based on results of executing 610 the one or more tasks identified in the message read from the second intermediate queue 365. Generating 620 the one or more messages based on results of executing 610 the one or more tasks identified in the message read from the second intermediate queue 365 can comprise generating one message per row of the obtained batch of rows. The generated 620 one or more messages can be stored 625 by the third worker application in a third intermediate queue 370 and an output queue 375. The third intermediate queue 370 can comprise an input queue for a fourth worker application of the plurality of worker applications and the one or more messages stored 625 in the third intermediate queue 370 can identify one or more tasks to be performed by the fourth worker application to identify files at a fourth level of the plurality of levels of the hierarchy.

Executing 610 the one or more tasks identified in the message read from the second intermediate queue 365 and generating 620 and storing 625 the one or more messages based on results of executing the one or more tasks identified in the message read from the second intermediate queue 365 can be repeated for up to the predetermined number of iterations. Accordingly, a determination 630 can be made as to whether all files have been identified and a determination 640 can be made as to whether the number of iterations have been completed, i.e., before all files have been identified. In response to identifying all files having an identifier of the third level of the hierarchy matching the identifier indicated in the message read from the second intermediate queue 365 before performing the predetermined number of iterations, the message can be deleted 635 from the second intermediate queue 365. In response to performing the predetermined number of iterations, the message can be deleted 645 from the second intermediate queue 365 and a new message can be written 650 to the second intermediate queue 365. The new message can indicate a progress of the predetermined number of iterations.

Figure 7:
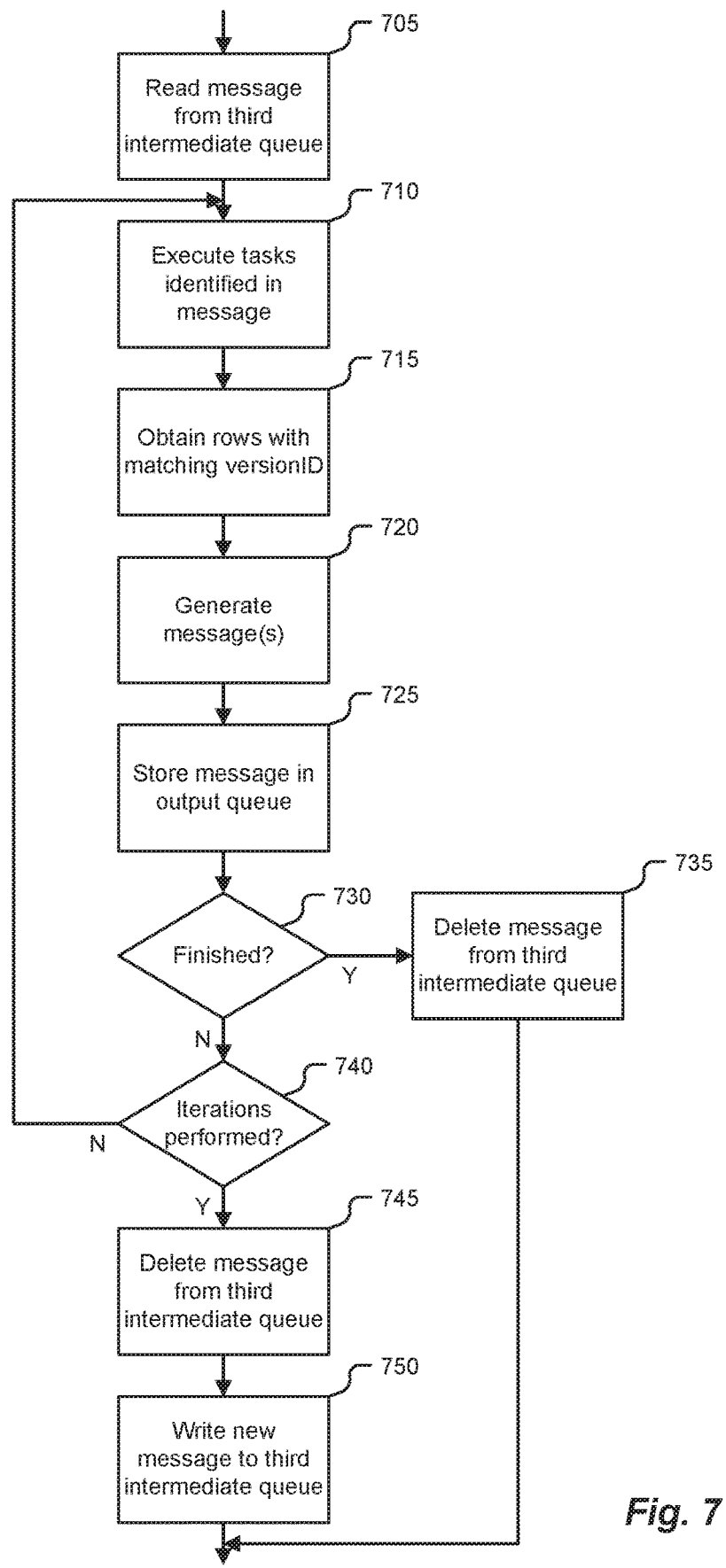
FIG. 7 is a flowchart illustrating an exemplary process for identifying and retrieving files of a set of hierarchically related files at a fourth level of the hierarchy according to one embodiment.

FIG. 7 is a flowchart illustrating an exemplary process for identifying and retrieving files of a set of hierarchically related files at a fourth level of the hierarchy according to one embodiment. As illustrated in this example, one of the one or more messages stored in the third intermediate queue 370 can be read 705 by the fourth worker application, such as file version worker 350, and the one or more tasks identified in the message read from the third intermediate queue 370 can be executed 710 by the fourth worker application. The one or more tasks can comprise one or more queries to a table associated with the fourth level of the hierarchy, such as file version table 330. The table associated with the fourth level of the hierarchy can identify files at the fourth level of the hierarchy based on the metadata for the files. Executing 710 the one or more tasks identified in the message read 705 from the third intermediate queue 370 can further comprise obtaining 715 a batch of rows from the table associated with the fourth level of the hierarchy. Each row of the obtained 715 batch of rows related to a file can have an identifier of the fourth level of the hierarchy matching an identifier indicated in the message read from the third intermediate queue 370. For example, the fourth level of the hierarchy can be associated with a version associated with the file and the identifier of the fourth level of the hierarchy can comprise a version identifier.

One or more messages can be generated 720 by the fourth worker application based on results of executing the one or more tasks identified in the message read from the third intermediate queue 370. Generating 720 the one or more messages based on results of executing the one or more tasks identified in the message read from the third intermediate queue 370 can comprise generating one message per row of the obtained batch of rows. The generated 720 one or more messages can be stored 725 in the output queue 375 by the fourth worker application.

Executing 710 the one or more tasks identified in the message read from the third intermediate queue 370 and generating 720 and storing 725 the one or more messages based on results of executing 710 the one or more tasks identified in the message read from the third intermediate queue 370 can be repeated for up to the predetermined number of iterations. Accordingly, a determination 730 can be made as to whether all files have been identified and a determination 740 can be made as to whether the number of iterations have been completed, i.e., before all files have been identified. In response to identifying all files having an identifier of the fourth level of the hierarchy matching the identifier indicated in the message read from the third intermediate queue 370 before performing the predetermined number of iterations, the message can be deleted 735 from the third intermediate queue 370. In response to performing the predetermined number of iterations, the message can be deleted 745 from the third intermediate queue 370 and a new message can be written 750 to the third intermediate queue 370. The new message can indicate a progress of the predetermined number of iterations. All versions of all files indicated by the messages stored in the output queue 375 by the third worker application and the fourth worker application can be retrieved by the fourth worker application or another application based on the messages written to the output queue.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for identifying hierarchically related files stored in a database, the method comprising:
   reading, by a first worker application of a plurality of worker applications executing on a server, from an input queue, an input message identifying one or more tasks to be performed by the first worker application to identify files at a first, top level of a plurality of levels of a hierarchy, wherein each level of the plurality of levels of the hierarchy is associated with one of a plurality of tables, wherein each table of the plurality of tables identifies files at the associated level of the hierarchy based on metadata for the files, and wherein the metadata further indicates a hierarchical relationship between the files stored in the database, wherein the first level of the hierarchy is associated with an enterprise and the identifier of the first level of the hierarchy comprises an enterprise identifier, wherein the second level of the hierarchy is associated with a user associated with the enterprise and the identifier of the second level of the hierarchy comprises a user identifier;
   executing, by the first worker application, the one or more tasks identified in the input message, wherein the one or more tasks comprise one or more queries to the table associated with the first level of the hierarchy;
   generating, by the first worker application, one or more messages based on results of executing the one or more tasks identified in the input message; and
   storing, by the first worker application, the generated one or more messages in a first intermediate queue, wherein the first intermediate queue comprises an input queue for a second worker application of the plurality of worker applications, the one or more messages stored in the first intermediate queue identifying one or more tasks to be performed by the second worker application to identify files at a second level of the plurality of levels of the hierarchy.

2. The method of claim 1, wherein executing the one or more tasks identified in the input message read from the input queue further comprises obtaining a batch of rows from the table associated with the first level of the hierarchy, each row of the obtained batch of rows related to a file having an identifier of the first level of the hierarchy matching an identifier indicated in the input message read from the input file, wherein generating the one or more messages based on results of executing the one or more tasks identified in the input message read from the input file comprises generating one message per row of the obtained batch of rows, and wherein executing the one or more tasks identified in the input message read from the input file comprises:
   repeating said executing the one or more tasks identified in the input message read from the input queue and said generating the one or more messages based on results of executing the one or more tasks identified in the input message read from the input file for up to a predetermined number of iterations;
   in response to identifying all files having an identifier of the first level of the hierarchy matching the identifier indicated in the input message read from the input queue before performing the predetermined number of iterations, deleting the input message from the input queue; and in response to performing the predetermined number of iterations, deleting the input message from the input queue and writing a new message to the input queue, the new message indicating a progress of the predetermined number of iterations.

3. The method of claim 1, further comprising:
reading, by the second worker application, one of the one or more messages stored in the first intermediate queue;
executing, by the second worker application, the one or more tasks identified in the message read from the first intermediate queue, wherein the one or more tasks comprise one or more queries to the table associated with the second level of the hierarchy;
generating, by the second worker application, one or more messages based on results of executing the one or more tasks identified in the message read from the first intermediate queue; and
storing, by the second worker application, the generated one or more messages in a second intermediate queue, wherein the second intermediate queue comprises an input queue for a third worker application of the plurality of worker applications, the one or more messages stored in the second intermediate queue identifying one or more tasks to be performed by the third worker application to identify files at a third level of the plurality of levels of the hierarchy.

4. The method of claim 3, wherein executing the one or more tasks identified in the message read from the first intermediate queue further comprises obtaining a batch of rows from the table associated with the second level of the hierarchy, each row of the obtained batch of rows related to a file having an identifier of the second level of the hierarchy matching an identifier indicated in the message read from the first intermediate queue, wherein generating the one or more messages based on results of executing the one or more tasks identified in the message read from the first intermediate queue comprises generating one message per row of the obtained batch of rows, and wherein executing the one or more tasks identified in the message read from the first intermediate queue comprises:
repeating said executing the one or more tasks identified in the message read from the first intermediate queue and said generating the one or more messages based on results of executing the one or more tasks identified in the message read from the first intermediate queue for up to the predetermined number of iterations;
in response to identifying all files having an identifier of the second level of the hierarchy matching the identifier indicated in the message read from the first intermediate queue before performing the predetermined number of iterations, deleting the message from the first intermediate queue; and
in response to performing the predetermined number of iterations, deleting the message from the first intermediate queue and writing a new message to the first intermediate queue, the new message indicating a progress of the predetermined number of iterations.

5. The method of claim 3, further comprising:
reading, by the third worker application, one of the one or more messages stored in the second intermediate queue;
executing, by the third worker application, the one or more tasks identified in the message read from the second intermediate queue, wherein the one or more tasks comprise one or more queries to the table associated with the third level of the hierarchy;
generating, by the third worker application, one or more messages based on results of executing the one or more tasks identified in the message read from the second intermediate queue; and
storing, by the third worker application, the generated one or more messages in a third intermediate queue and an output queue, wherein the third intermediate queue comprises an input queue for a fourth worker application of the plurality of worker applications, the one or more messages stored in the third intermediate queue identifying one or more tasks to be performed by the fourth worker application to identify files at a fourth level of the plurality of levels of the hierarchy.

6. The method of claim 5, wherein executing the one or more tasks identified in the message read from the second intermediate queue further comprises obtaining a batch of rows from the table associated with the third level of the hierarchy, each row of the obtained batch of rows related to a file having an identifier of the third level of the hierarchy matching an identifier indicated in the message read from the second intermediate queue, wherein generating the one or more messages based on results of executing the one or more tasks identified in the message read from the second intermediate queue comprises generating one message per row of the obtained batch of rows, and wherein executing the one or more tasks identified in the message read from the second intermediate queue comprises:
repeating said executing the one or more tasks identified in the message read from the second intermediate queue and said generating the one or more messages based on results of executing the one or more tasks identified in the message read from the second intermediate queue for up to the predetermined number of iterations;
in response to identifying all files having an identifier of the third level of the hierarchy matching the identifier indicated in the message read from the second intermediate queue before performing the predetermined number of iterations, deleting the message from the second intermediate queue; and
in response to performing the predetermined number of iterations, deleting the message from the second intermediate queue and writing a new message to the second intermediate queue, the new message indicating a progress of the predetermined number of iterations.

7. The method of claim 5, further comprising:
reading, by the fourth worker application, one of the one or more messages stored in the third intermediate queue;
executing, by the fourth worker application, the one or more tasks identified in the message read from the third intermediate queue, wherein the one or more tasks comprise one or more queries to the table associated with the fourth level of the hierarchy;
generating, by the fourth worker application, one or more messages based on results of executing the one or more tasks identified in the message read from the third intermediate queue;
storing, by the fourth worker application, the generated one or more messages in the output queue; and
retrieving, by the fourth worker application, all versions of all files indicated by the messages stored in the output queue by the third worker application and the fourth worker application.

8. The method of claim 7, wherein executing the one or more tasks identified in the message read from the third intermediate queue further comprises obtaining a batch of rows from the table associated with the fourth level of the hierarchy, each row of the obtained batch of rows related to a file having an identifier of the fourth level of the hierarchy matching an identifier indicated in the message read from the third intermediate queue, wherein generating the one or more messages based on results of executing the one or more tasks identified in the message read from the third intermediate queue comprises generating one message per row of the obtained batch of rows, and wherein executing the one or more tasks identified in the message read from the third intermediate queue comprises:

repeating said executing the one or more tasks identified in the message read from the third intermediate queue and said generating the one or more messages based on results of executing the one or more tasks identified in the message read from the third intermediate queue for up to the predetermined number of iterations;

in response to identifying all files having an identifier of the fourth level of the hierarchy matching the identifier indicated in the message read from the third intermediate queue before performing the predetermined number of iterations, deleting the message from the third intermediate queue; and in response to performing the predetermined number of iterations, deleting the message from the third intermediate queue and writing a new message to the third intermediate queue, the new message indicating a progress of the predetermined number of iterations.

9. The method of claim 7, wherein the third level of the hierarchy is associated with a file associated with the user and the identifier of the third level of the hierarchy comprises a file identifier, and wherein the fourth level of the hierarchy is associated with a version associated with the file and the identifier of the fourth level of the hierarchy comprises a version identifier.

10. A system comprising:
a processor; and
a memory coupled with and readable by the processor and storing therein a set of instructions which, when executed by the processor, causes the processor to identify hierarchically related files stored in a database by:

reading, by an enterprise worker application of a plurality of worker applications executing by the processor, from an input queue, an input message identifying one or more tasks to be performed by the enterprise worker application to identify files at a top, enterprise level of a plurality of levels of a hierarchy, wherein each level of the plurality of levels of the hierarchy is associated with one of a plurality of tables, wherein each table of the plurality of tables identifies files at the associated level of the hierarchy based on metadata for the files, and wherein the metadata further indicates a hierarchical relationship between the files stored in the database, wherein the first level of the hierarchy is associated with an enterprise and the identifier of the first level of the hierarchy comprises an enterprise identifier, wherein the second level of the hierarchy is associated with a user associated with the enterprise and the identifier of the second level of the hierarchy comprises a user identifier, wherein the third level of the hierarchy is associated with a file associated with the user and the identifier of the third level of the hierarchy comprises a file identifier, and wherein the fourth level of the hierarchy is associated with a version associated with the file and the identifier of the fourth level of the hierarchy comprises a version identifier;

executing, by the enterprise worker application, the one or more tasks identified in the input message, wherein the one or more tasks comprise one or more queries to the table associated with the enterprise level of the hierarchy;

generating, by the enterprise worker application, one or more messages based on results of executing the one or more tasks identified in the input message; and storing, by the enterprise worker application, the generated one or more messages in a first intermediate queue, wherein the first intermediate queue comprises an input queue for a user worker application of the plurality of worker applications, the one or more messages stored in the first intermediate queue identifying one or more tasks to be performed by the user worker application to identify files at a user level of the plurality of levels of the hierarchy.

11. The system of claim 10, wherein executing the one or more tasks identified in the input message read from the input queue further comprises obtaining a batch of rows from the table associated with the enterprise level of the hierarchy, each row of the obtained batch of rows related to a file having an enterprise identifier matching an enterprise identifier indicated in the input message read from the input file, wherein generating the one or more messages based on results of executing the one or more tasks identified in the input message read from the input file comprises generating one message per row of the obtained batch of rows, and wherein executing the one or more tasks identified in the input message read from the input file comprises:

repeating said executing the one or more tasks identified in the input message read from the input queue and said generating the one or more messages based on results of executing the one or more tasks identified in the input message read from the input file for up to a predetermined number of iterations;

in response to identifying all files having an enterprise identifier matching the enterprise identifier indicated in the input message read from the input queue before performing the predetermined number of iterations, deleting the input message from the input queue; and in response to performing the predetermined number of iterations, deleting the input message from the input queue and writing a new message to the input queue, the new message indicating a progress of the predetermined number of iterations.

12. The system of claim 10, further comprising:
reading, by the user worker application, one of the one or more messages stored in the first intermediate queue;
executing, by the user worker application, the one or more tasks identified in the message read from the first intermediate queue, wherein the one or more tasks comprise one or more queries to the table associated with the user level of the hierarchy;
generating, by the user worker application, one or more messages based on results of executing the one or more tasks identified in the message read from the first intermediate queue; and
storing, by the user worker application, the generated one or more messages in a second intermediate queue, wherein the second intermediate queue comprises an input queue for a file worker application of the plurality of worker applications, the one or more messages stored in the second intermediate queue identifying one or more tasks to be performed by the file worker application to identify files at a file level of the plurality of levels of the hierarchy.

13. The system of claim 12, wherein executing the one or more tasks identified in the message read from the first intermediate queue further comprises obtaining a batch of rows from the table associated with the user level of the hierarchy, each row of the obtained batch of rows related to a file having a user identifier matching a user identifier indicated in the message read from the first intermediate queue, wherein generating the one or more messages based on results of executing the one or more tasks identified in the message read from the first intermediate queue comprises generating one message per row of the obtained batch of rows, and wherein executing the one or more tasks identified in the message read from the first intermediate queue comprises:
   repeating said executing the one or more tasks identified in the message read from the first intermediate queue and said generating the one or more messages based on results of executing the one or more tasks identified in the message read from the first intermediate queue for up to the predetermined number of iterations;
   in response to identifying all files having a user identifier matching the user identifier indicated in the message read from the first intermediate queue before performing the predetermined number of iterations, deleting the message from the first intermediate queue; and
   in response to performing the predetermined number of iterations, deleting the message from the first intermediate queue and writing a new message to the first intermediate queue, the new message indicating a progress of the predetermined number of iterations.

14. The system of claim 12, further comprising:
   reading, by the file worker application, one of the one or more messages stored in the second intermediate queue;
   executing, by the file worker application, the one or more tasks identified in the message read from the second intermediate queue, wherein the one or more tasks comprise one or more queries to the table associated with the file level of the hierarchy;
   generating, by the file worker application, one or more messages based on results of executing the one or more tasks identified in the message read from the second intermediate queue; and
   storing, by the file worker application, the generated one or more messages in a third intermediate queue and an output queue, wherein the third intermediate queue comprises an input queue for a file version worker application of the plurality of worker applications, the one or more messages stored in the third intermediate queue identifying one or more tasks to be performed by the file version worker application to identify files at a version level of the plurality of levels of the hierarchy.

15. The system of claim 14, wherein executing the one or more tasks identified in the message read from the second intermediate queue further comprises obtaining a batch of rows from the table associated with the file level of the hierarchy, each row of the obtained batch of rows related to a file having a file identifier matching a file identifier indicated in the message read from the second intermediate queue, wherein generating the one or more messages based on results of executing the one or more tasks identified in the message read from the second intermediate queue comprises generating one message per row of the obtained batch of rows, and wherein executing the one or more tasks identified in the message read from the second intermediate queue comprises:
   repeating said executing the one or more tasks identified in the message read from the second intermediate queue and said generating the one or more messages based on results of executing the one or more tasks identified in the message read from the second intermediate queue for up to the predetermined number of iterations;
   in response to identifying all files having a file identifier matching the file identifier indicated in the message read from the second intermediate queue before performing the predetermined number of iterations, deleting the message from the second intermediate queue; and
   in response to performing the predetermined number of iterations, deleting the message from the second intermediate queue and writing a new message to the second intermediate queue, the new message indicating a progress of the predetermined number of iterations.

16. The system of claim 14, further comprising:
   reading, by the file version worker application, one of the one or more messages stored in the third intermediate queue;
   executing, by the file version worker application, the one or more tasks identified in the message read from the third intermediate queue, wherein the one or more tasks comprise one or more queries to the table associated with the version level of the hierarchy;
   generating, by the file version worker application, one or more messages based on results of executing the one or more tasks identified in the message read from the third intermediate queue;
   storing, by the file version worker application, the generated one or more messages in the output queue; and
   retrieving, by the file version worker application, all versions of all files indicated by the messages stored in the output queue by the file worker application and the file version worker application.

17. The system of claim 16, wherein executing the one or more tasks identified in the message read from the third intermediate queue further comprises obtaining a batch of rows from the table associated with the version level of the hierarchy, each row of the obtained batch of rows related to a file having a file version identifier matching a file version identifier indicated in the message read from the third intermediate queue, wherein generating the one or more messages based on results of executing the one or more tasks identified in the message read from the third intermediate queue comprises generating one message per row of the obtained batch of rows, and wherein executing the one or more tasks identified in the message read from the third intermediate queue comprises:
   repeating said executing the one or more tasks identified in the message read from the third intermediate queue and said generating the one or more messages based on results of executing the one or more tasks identified in the message read from the third intermediate queue for up to the predetermined number of iterations;
   in response to identifying all files having a file version identifier matching the file version identifier indicated in the message read from the third intermediate queue before performing the predetermined number of iterations, deleting the message from the third intermediate queue; and in response to performing the predetermined number of iterations, deleting the message from the third intermediate queue and writing a new message to the third intermediate queue, the new message indicating a progress of the predetermined number of iterations.

18. A non-transitory, computer-readable medium comprising a set of instructions stored therein which, when executed by a processor, causes the processor to identify hierarchically related files stored in a database by:

reading, by an enterprise worker application of a plurality of worker applications executing by the processor, from an input queue, an input message identifying one or more tasks to be performed by the enterprise worker application to identify files at a top, enterprise level of a plurality of levels of a hierarchy;

executing, by the enterprise worker application, the one or more tasks identified in the input message, wherein the one or more tasks comprise one or more queries to a table associated with the enterprise level of the hierarchy, the table associated with the enterprise level of the hierarchy identifying files at the enterprise level of the hierarchy based on metadata for the files, the metadata further indicating a hierarchical relationship between the files stored in the database, wherein executing the one or more tasks identified in the input message read from the input queue further comprises obtaining a batch of rows from the table associated with the enterprise level of the hierarchy, each row of the obtained batch of rows related to a file having an enterprise identifier matching an enterprise identifier indicated in the input message read from the input file;

generating, by the enterprise worker application, one or more messages based on results of executing the one or more tasks identified in the input message, wherein generating the one or more messages based on results of executing the one or more tasks identified in the input message read from the input file comprises generating one message per row of the obtained batch of rows;

repeating said executing the one or more tasks identified in the input message read from the input queue and said generating the one or more messages based on results of executing the one or more tasks identified in the input message read from the input file for up to a predetermined number of iterations;

in response to identifying all files having an enterprise identifier matching the enterprise identifier indicated in the input message read from the input queue before performing the predetermined number of iterations, deleting the input message from the input queue;

in response to performing the predetermined number of iterations, deleting the input message from the input queue and writing a new message to the input queue, the new message indicating a progress of the predetermined number of iterations;

storing, by the enterprise worker application, the generated one or more messages in a first intermediate queue, wherein the first intermediate queue comprises an input queue for a user worker application of the plurality of worker applications, the one or more messages stored in the first intermediate queue identifying one or more tasks to be performed by the user worker application to identify files at a user level of the plurality of levels of the hierarchy;

reading, by the user worker application, one of the one or more messages stored in the first intermediate queue;

executing, by the user worker application, the one or more tasks identified in the message read from the first intermediate queue, wherein the one or more tasks comprise one or more queries to a table associated with the user level of the hierarchy, the table associated with the user level of the hierarchy identifying files at the user level of the hierarchy based on the metadata for the files, wherein executing the one or more tasks identified in the message read from the first intermediate queue further comprises obtaining a batch of rows from the table associated with the user level of the hierarchy, each row of the obtained batch of rows related to a file having a user identifier matching a user identifier indicated in the message read from the first intermediate queue;

generating, by the user worker application, one or more messages based on results of executing the one or more tasks identified in the message read from the first intermediate queue, wherein generating the one or more messages based on results of executing the one or more tasks identified in the message read from the first intermediate queue comprises generating one message per row of the obtained batch of rows;

repeating said executing the one or more tasks identified in the message read from the first intermediate queue and said generating the one or more messages based on results of executing the one or more tasks identified in the message read from the first intermediate queue for up to the predetermined number of iterations;

in response to identifying all files having a user identifier matching the user identifier indicated in the message read from the first intermediate queue before performing the predetermined number of iterations, deleting the message from the first intermediate queue;

in response to performing the predetermined number of iterations, deleting the message from the first intermediate queue and writing a new message to the first intermediate queue, the new message indicating a progress of the predetermined number of iterations; and storing, by the user worker application, the generated one or more messages in a second intermediate queue, wherein the second intermediate queue comprises an input queue for a file worker application of the plurality of worker applications, the one or more messages stored in the second intermediate queue identifying one or more tasks to be performed by the file worker application to identify files at a file level of the plurality of levels of the hierarchy.

19. The non-transitory, computer-readable medium of claim 18, further comprising:

reading, by the file worker application, one of the one or more messages stored in the second intermediate queue;

executing, by the file worker application, the one or more tasks identified in the message read from the second intermediate queue, wherein the one or more tasks comprise one or more queries to a table associated with the file level of the hierarchy, the table associated with the file level of the hierarchy identifying files at the file level of the hierarchy based on the metadata for the files, wherein executing the one or more tasks identified in the message read from the second intermediate queue further comprises obtaining a batch of rows from the table associated with the file level of the hierarchy, each row of the obtained batch of rows related to a file having a file identifier matching a file identifier indicated in the message read from the second intermediate queue;

generating, by the file worker application, one or more messages based on results of executing the one or more tasks identified in the message read from the second intermediate queue, wherein generating the one or more messages based on results of executing the one or more tasks identified in the message read from the second intermediate queue comprises generating one message per row of the obtained batch of rows;

repeating said executing the one or more tasks identified in the message read from the second intermediate queue and said generating the one or more messages based on results of executing the one or more tasks identified in the message read from the second intermediate queue for up to the predetermined number of iterations;

in response to identifying all files having a file identifier matching the file identifier indicated in the message read from the second intermediate queue before performing the predetermined number of iterations, deleting the message from the second intermediate queue; and in response to performing the predetermined number of iterations, deleting the message from the second intermediate queue and writing a new message to the second intermediate queue, the new message indicating a progress of the predetermined number of iterations.

storing, by the file worker application, the generated one or more messages in a third intermediate queue and an output queue, wherein the third intermediate queue comprises an input queue for a file version worker application of the plurality of worker applications, the one or more messages stored in the third intermediate queue identifying one or more tasks to be performed by the file version worker application to identify files at a version level of the plurality of levels of the hierarchy.

20. The non-transitory, computer-readable medium of claim 19, further comprising:

reading, by the file version worker application, one of the one or more messages stored in the third intermediate queue;

executing, by the file version worker application, the one or more tasks identified in the message read from the third intermediate queue, wherein the one or more tasks comprise one or more queries to a table associated with the version level of the hierarchy, the table associated with the version level of the hierarchy identifying files at the version level of the hierarchy based on the metadata for the files, wherein executing the one or more tasks identified in the message read from the third intermediate queue further comprises obtaining a batch of rows from the table associated with the version level of the hierarchy, each row of the obtained batch of rows related to a file having a file version identifier matching a file version identifier indicated in the message read from the third intermediate queue;

generating, by the file version worker application, one or more messages based on results of executing the one or more tasks identified in the message read from the third intermediate queue, wherein generating the one or more messages based on results of executing the one or more tasks identified in the message read from the third intermediate queue comprises generating one message per row of the obtained batch of rows;

repeating said executing the one or more tasks identified in the message read from the third intermediate queue and said generating the one or more messages based on results of executing the one or more tasks identified in the message read from the third intermediate queue for up to the predetermined number of iterations;

in response to identifying all files having a file version identifier matching the file version identifier indicated in the message read from the third intermediate queue before performing the predetermined number of iterations, deleting the message from the third intermediate queue; and in response to performing the predetermined number of iterations, deleting the message from the third intermediate queue and writing a new message to the third intermediate queue, the new message indicating a progress of the predetermined number of iterations storing, by the file version worker application, the generated one or more messages in the output queue; and retrieving, by the file version worker application, all versions of all files indicated by the messages stored in the output queue by the file worker application and the file version worker application.

* * * * *